US008424450B2

(12) United States Patent
Jeon et al.

(10) Patent No.: US 8,424,450 B2
(45) Date of Patent: Apr. 23, 2013

(54) COOKING APPARATUS

(75) Inventors: Ki Suk Jeon, Seongnam-si (KR); Jong Hak Hyun, Seoul (KR); Jong Chull Shon, Suwon-si (KR); Tae Woo Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 512 days.

(21) Appl. No.: 12/656,282

(22) Filed: Jan. 22, 2010

(65) Prior Publication Data

US 2010/0212512 A1 Aug. 26, 2010

Related U.S. Application Data

(60) Provisional application No. 61/155,290, filed on Feb. 25, 2009.

(30) Foreign Application Priority Data

May 13, 2009 (KR) ........................... 10-2009-41818

(51) Int. Cl.
*A47J 37/08* (2006.01)
*A47J 27/02* (2006.01)

(52) U.S. Cl.
USPC .................. 99/401; 99/422; 99/446; 99/447; 219/450.1; 219/455.12; 219/452.11; 219/460.1

(58) Field of Classification Search .................... 99/401, 99/447, 422, 446; 219/455.12, 460.1, 452.1, 219/450.1, 443.1; 126/39 H, 39 K
See application file for complete search history.

(56) References Cited

U.S. PATENT DOCUMENTS

| | | | | |
|---|---|---|---|---|
| 3,544,765 | A | 12/1970 | Kuster | |
| 3,745,912 | A * | 7/1973 | Field | 99/446 |
| 4,489,234 | A | 12/1984 | Harnden, Jr. et al. | |
| 4,862,795 | A * | 9/1989 | Hawkins | 99/446 |
| 5,176,067 | A * | 1/1993 | Higgins | 99/340 |
| 5,471,914 | A * | 12/1995 | Krasznai et al. | 99/389 |
| 5,676,049 | A * | 10/1997 | Arnold | 99/401 |
| 5,755,154 | A * | 5/1998 | Schroeter et al. | 99/401 |
| 5,782,230 | A * | 7/1998 | Linnebur et al. | 126/41 R |
| 6,105,487 | A * | 8/2000 | Nash et al. | 99/400 |
| 6,267,047 | B1 * | 7/2001 | Mosher et al. | 99/339 |
| 6,453,801 | B1 * | 9/2002 | Masel et al. | 99/330 |
| 8,037,879 | B2 * | 10/2011 | Murrin et al. | 126/39 B |
| 8,181,640 | B2 * | 5/2012 | Park | 126/376.1 |

FOREIGN PATENT DOCUMENTS

| | | |
|---|---|---|
| DE | 1 753 176 | 7/1971 |
| GB | 2 201 320 | 8/1988 |
| JP | 2006-228971 | 8/2006 |
| KR | 1998-029169 | 8/1998 |
| KR | 1999-0034704 | 5/1999 |

OTHER PUBLICATIONS

European Search Report dated Jun. 10, 2010 issued in corresponding European Patent Application.

* cited by examiner

*Primary Examiner* — Reginald L Alexander
(74) *Attorney, Agent, or Firm* — Staas & Halsey LLP

(57) ABSTRACT

A cooking apparatus equipped with a heating device enabling uniform distribution of heat. The cooking apparatus includes a plate to put a cooker thereon, a heater disposed under the plate, and a guide member disposed between the plate and the heater to induce energy emitted from the heater toward the plate.

10 Claims, 4 Drawing Sheets

COOKING APPARATUS

CROSS-REFERENCE TO RELATED APPLICATIONS

This application claims the benefit of Korean Patent Application No. 2009-0041818 filed on May 13, 2009 in the Korean Intellectual Property Office and U.S. Provisional Patent Application No. 61/155,290 filed on Feb. 25, 2009, the disclosures of which are incorporated herein by reference.

BACKGROUND

1. Field

Embodiments relate to a cooking apparatus having an improved mounting structure of a heat source to heat food.

2. Description of the Related Art

A cooking apparatus refers to an apparatus to process or cook food by heating the food. A halogen heater may be used for a heat source to heat the food in the cooking apparatus. The halogen heater transmits heat using a visible ray or an infrared ray and thereby cooks food.

A cooking apparatus using such a halogen heater uses electricity and therefore does not consume oxygen nor exhaust toxic gas. Furthermore, the aesthetic appearance of the cooking apparatus may be improved. Differently from a cooking apparatus using gas, the halogen heater cooking apparatus has a simple appearance with a flat top side and therefore is convenient to install in a built-in manner. Accordingly; the halogen heater is getting spotlighted as a heat source for cooking apparatuses.

SUMMARY

Therefore, it is an aspect to provide a cooking apparatus to enhance the energy transmission efficiency by improving a mounting structure of a heater.

It is another aspect to provide a cooking apparatus enabling uniform distribution of energy by improving a mounting structure of a heater.

Additional aspects will be set forth in part in the description which follows and, in part, will be apparent from the description, or may be learned by practice of the invention.

In accordance with one aspect, a cooking apparatus includes a plate to put a cooker thereon, a heater disposed under the plate, and a guide member disposed between the plate and the heater to induce energy emitted from the heater toward the plate.

The guide member may include a plurality of tunnels partitioned from one another, and the tunnels pass and reflect the energy being emitted from the heater.

The tunnels may have a predetermined length.

The tunnels may include a material capable of reflecting an image of the heater.

The guide member may have a lattice structure having a predetermined thickness.

The heater may include a halogen heater.

The cooking apparatus may further include a reflection member disposed under the heater to reflect energy from the heater toward the guide member.

In accordance with another aspect, a cooking apparatus includes a plate to put a cooker thereon, a heater disposed under the plate, and a reflection member disposed under the heater, wherein the reflection member includes at least one uneven surface part to reflect the energy emitted from the heater in several directions.

The uneven surface part may include at least one plane surface.

A guide member may be further provided between the plate and the heater, and the reflection member may include a peripheral part supporting the guide member.

The peripheral part may enclose a lateral side of the heater.

In accordance with another aspect, a cooking apparatus includes a plate to put a cooker thereon, a heater disposed under the plate to emit energy, a reflection member disposed under the heater to reflect the energy toward the plate, and a guide member disposed above the heater to induce the energy toward the plate.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
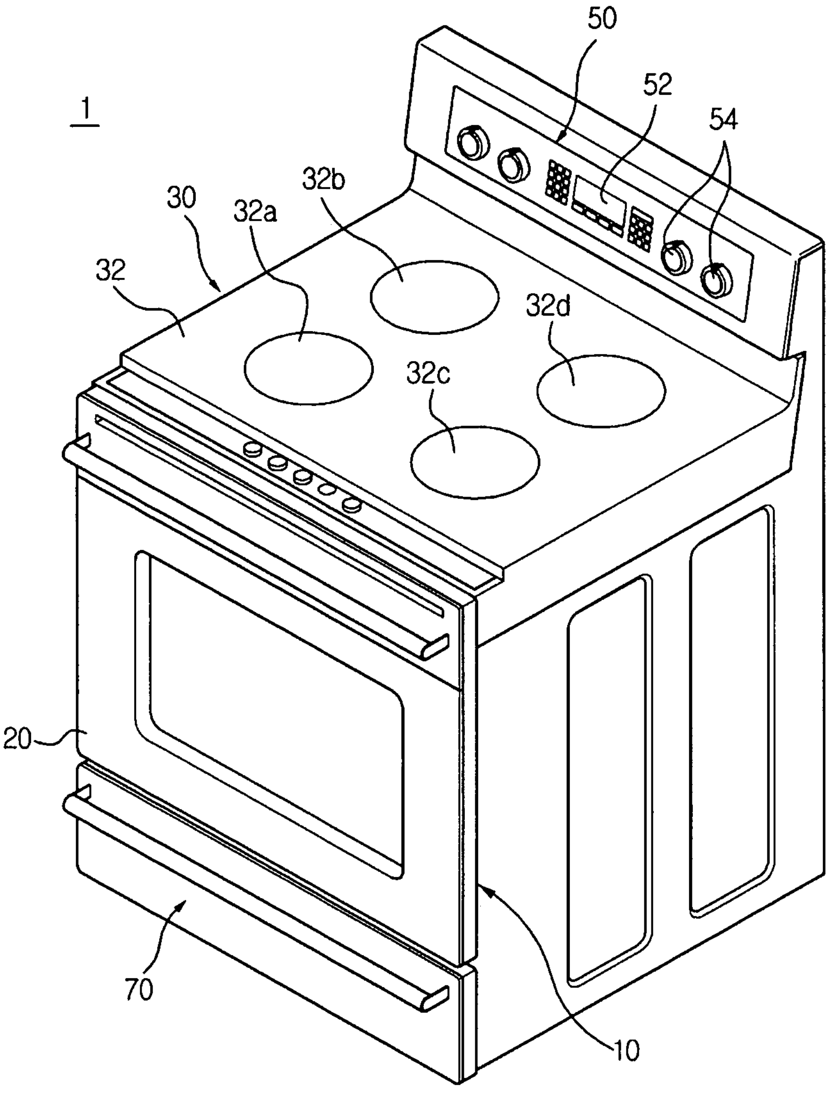
FIG. 1 is a perspective view showing the external appearance of a cooking apparatus according to an embodiment.

Reference will now be made in detail to the embodiments of the present invention, examples of which are illustrated in the accompanying drawings, wherein like reference numerals refer to the like elements throughout.

Figure 2:
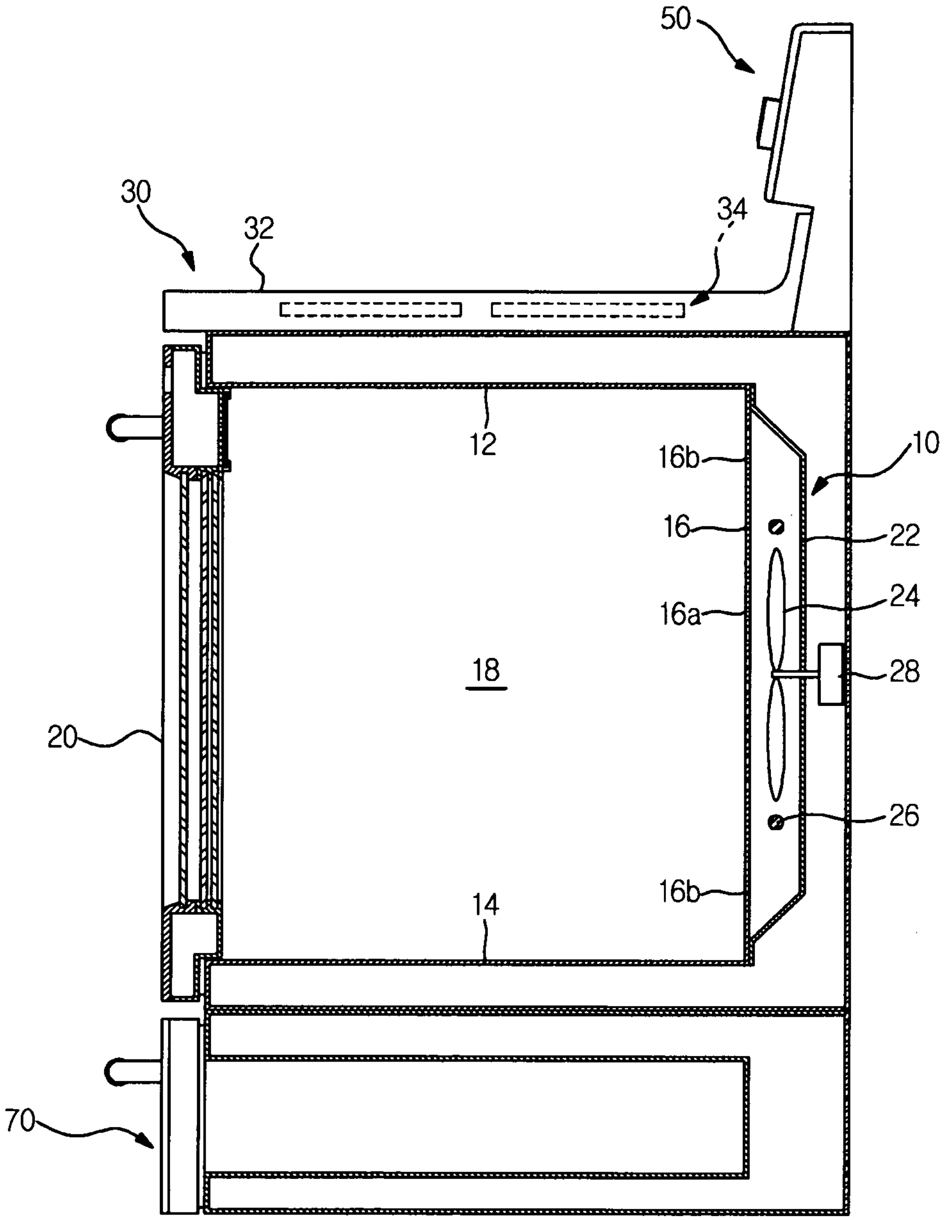
FIG. 2 is a view showing the structure of the cooking apparatus shown in FIG. 1.
Figure 3:
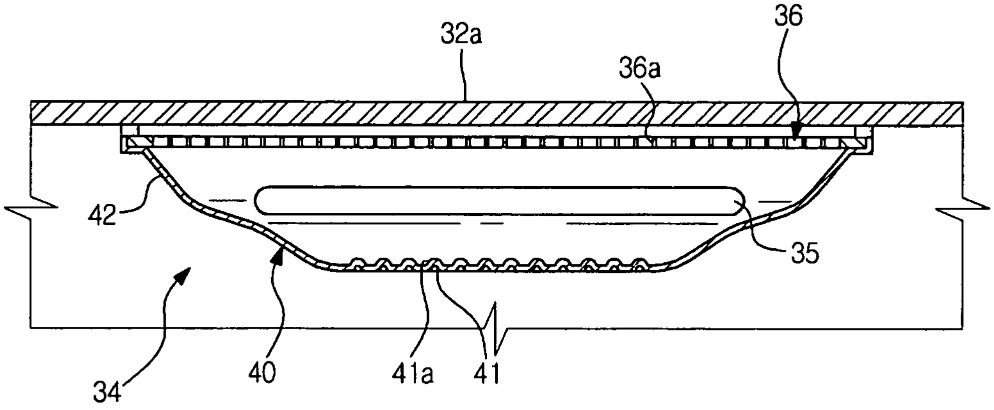
FIG. 3 is a sectional view showing the structure of a cook top of the cooking apparatus of FIG. 1.
Figure 4:
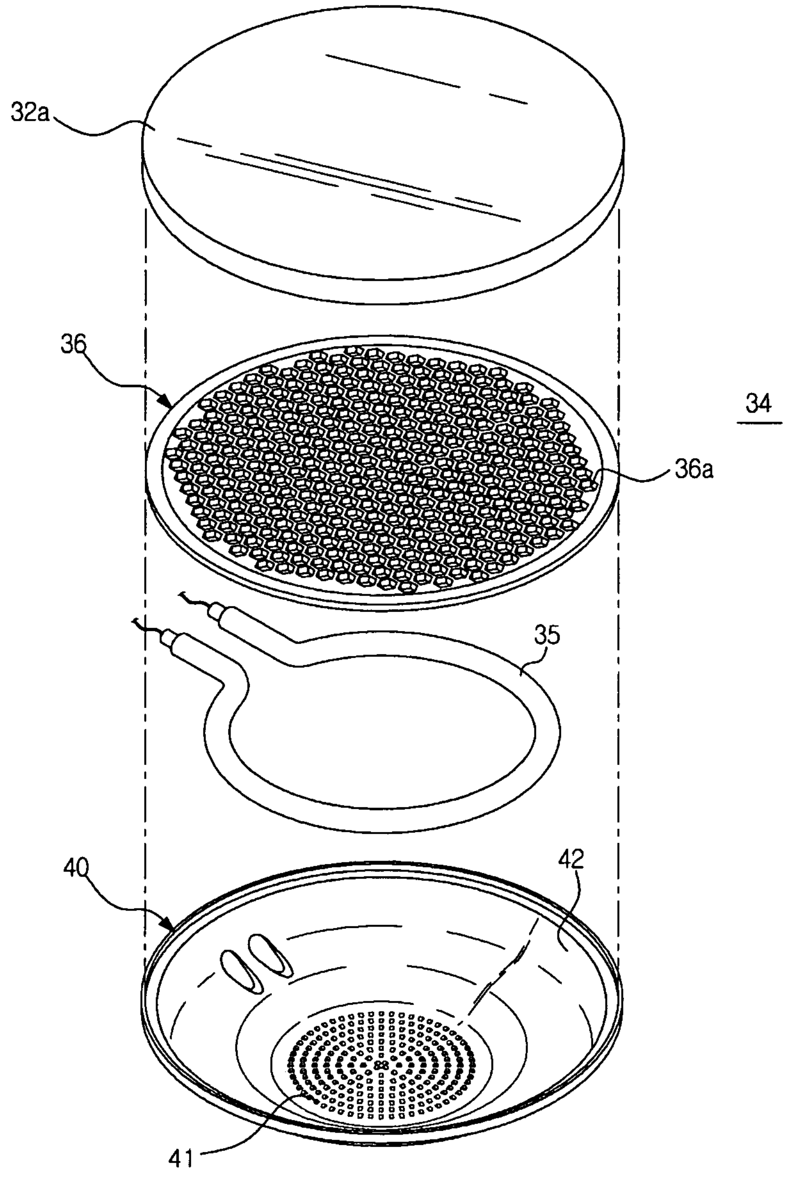
FIG. 4 is a perspective view showing the structure of the cook top shown in FIG. 1.

FIG. 1 is a perspective view showing the external appearance of a cooking apparatus according to an embodiment. FIG. 2 is a view showing the structure of the cooking apparatus shown in FIG. 1. FIG. 3 is a sectional view showing the structure of a cook top of the cooking apparatus of FIG. 1, and FIG. 4 is a perspective view showing the structure of the cook top shown in FIG. 1.

As shown in FIG. 1 through FIG. 4, a cooking apparatus 1 according to the embodiment includes an oven 10 to heat and cook food under a hermetic state, a cook top 30 disposed at the upper part of the oven 10 to put a cooker thereon and thereby cook food in the cooker, a control unit 50 provided at the rear part of the cook top 30 to control the operations of the oven 10 and the cook top 30, and a drawer unit 70 disposed at the lower part of the oven 10 to serve as a storage space and perform simple cooking.

The oven 10 cooks food by convection of heat. To this end, the oven 10 includes a cooking chamber 18 defined by an upper plate 12, a bottom plate 14, both sidewall plates (not shown) and a rear plate 16, and an oven door 20 opening and closing an opened front side of the cooking chamber 18.

A fan cover 22 is connected at the outside of the rear plate 16. A convection fan 24 is mounted to the fan cover 22 to circulate the inner air of the cooking chamber 18. A convection heater 26 is mounted at an outer circumference of the convection fan 24. In addition, a fan motor 28 is mounted at the rear part of the fan cover 22 to drive the convection fan 24.

A plurality of suction holes **16*a* are formed around the center of the rear plate 16 facing the convection fan 24, so as to draw in the inner air of the cooking chamber 18. Also, a plurality of discharge holes 16*b* are formed at peripheral parts of the rear plate 16 to supply heat into the cooking chamber 18**.

After food is put in the cooking chamber 18 and the oven door 20 is closed, when the oven 10 is turned on, the convection heater 26 is heated. Accordingly, the convection fan 24 is rotated by the fan motor 28. The inner air of the cooking chamber 18 is drawn in through the suction holes 16*a*, thereby being heated by the convection heater 26, and then supplied into the cooking chamber 18 through the discharge holes 16*b*. The heated air cooks the food as circulating through the cooking chamber 18.

The control unit 50 is equipped with a display 52 to display the operational state of the cooking apparatus 1 and operation knobs 54 to control the operation of the cooking apparatus 1. The drawer unit 70, being in the form of a drawer, dedicatedly includes a heater to reheat cooked food or perform simple cooking.

The cook top 30 is disposed at the upper part of the oven 10. The cook top 30 includes a cooking hob 32 to put a cooker thereon, and a heating device 34 disposed under the cooking hob 32 to heat the cooker put on the cooking hob 32.

The cooking hob 32 includes a solid-body plate. In the drawing, first to fourth cooking areas 32*a*, 32*b*, 32*c* and 32*d* are defined by circular lines on the cooking hob 32. However, it is noted that the cooking hob 32 is not limited to have such a solid-body plate. A user puts a cooker containing food on at least one of the cooking areas 32*a*, 32*b*, 32*c* and 32*d* and operates the corresponding heating device 34 disposed under the cooking area. Hereinafter, more specifically, the heating device 34 disposed under the first cooking area 32*a* will be explained representatively.

The heating device 34 includes a heater 35, a reflection member 40, and a guide member 36. Here, the heater 35 may include a halogen heater.

The heater 35 is used as a heat source, that is, a heat generating medium to heat the food. The heater 35 may have various forms, for example a round form as shown in FIG. 3. The heater 35 being disposed under the first cooking area 32*a* transmits energy in a vertical direction or a horizontal direction. The reflection member 40 is disposed at a lower part of the heater 35 to reflect the energy being transmitted to the lower part of the heater 35. The guide member 36 is disposed at an upper part of the heater 35 to induce the energy being transmitted to the upper part of the heater 35 toward the first cooking area 32*a*. Here, the energy refers to heat or light emitted from the heater 35.

The reflection member 40 encloses the heater 35. As shown in FIG. 3, for example, the heater 35 may have a round form while the reflection member 40 has a bowl form enclosing the heater 35. That is, the reflection member 40 reflects the energy emitted toward the lateral sides or the lower part of the heater 35, to the first cooking area 32*a* by having the bowl form enclosing the heater 35.

The reflection member 40 may include at least one uneven surface part 41 disposed in the center thereof. The uneven surface part 41 may prevent the energy emitted from the heater 35 from concentrating on any specific spot and help evenly distribute the energy, such that the energy is uniformly transmitted through the first cooking area 32*a*. The uneven surface part 41 may include at least one plane surface 41*a*. As the uneven surface part 41 has a more complicated form, the reflection and distribution efficiency of the energy would be more improved. For example, whereas the uneven surface part 41 having one plane surface reflects the energy incident to the plane surface to the opposite direction, the uneven surface part 41 having a plurality of plane surfaces reflects the energy in several directions. In addition, as the uneven surface part 41 has the more complicated form, a diffused reflection degree is maximized, thereby achieving uniform distribution of heat transmitted the first cooking area 32.

The guide member 36 is mounted to a peripheral part 42 of the reflection member 40. The peripheral part 42 is extended higher than the heater 35, enclosing the lateral side of the heater 35. The guide member 36 is disposed at the upper part of the heater 35, being supported by the peripheral part 42. The guide member 36 guides, toward the first cooking area 32*a*, the energy emitted upward from the heater 35 and the energy reflected upward by the reflection member 30. Since the guide member 36 has a honeycomb lattice structure of a predetermined thickness, that is, including a plurality of tunnels 36*a* partitioned from one another, the energy may be evenly transmitted in certain directions.

The energy emitted from the heater 35 is passed through the plurality of tunnels 36*a* and transmitted to the first cooking area 32*a*. Here, the energy while passing through the tunnels 36*a* is totally reflected and then induced to the first cooking area 32*a*. That is, as the energy that may dazzle the user's eyes is induced to the first cooking area 32*a* by the guide member 36, dazzling of the user's eyes may be restrained.

The guide member 36 may be formed of aluminum or stainless steel. Especially, the plurality of tunnels 36*a* may be formed of an image reflecting material. In this case, the plurality of tunnels 36*a* all reflect an image of the heater 35 and therefore the user visually recognizes as if a plurality of heaters were provided. Such a phenomenon occurs more effectively because the tunnels 36*a* have the lattice structure. The user may be able to check whether the heat is being uniformly distributed through the first cooking area 32*a* and thereby determine that the apparatus is normally operating.

As is apparent from the above description, a cooking apparatus according to the embodiments may greatly improve the energy reflection efficiency while achieving uniform distribution of the energy.

In addition, dazzling by emitted energy may be prevented since the energy is induced to a predetermined direction.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A cooking apparatus comprising:

a plate to put a cooker thereon;

a heater disposed under the plate;

a guide member disposed between the plate and the heater to induce energy emitted from the heater toward the plate; and a reflection member disposed under the heater to reflect energy from the heater toward the guide member, wherein the guide member is mounted to a peripheral part of the reflection member.

2. The cooking apparatus according to claim 1, wherein the guide member comprises a plurality of tunnels partitioned from one another, and the tunnels pass and reflect the energy being emitted from the heater.

3. The cooking apparatus according to claim 2, wherein the tunnels have a predetermined length.

4. The cooking apparatus according to claim 2, wherein the tunnels comprise a material capable of reflecting an image of the heater.

5. The cooking apparatus according to claim 1, wherein the guide member has a lattice structure having a predetermined thickness.

6. The cooking apparatus according to claim 1, wherein the heater comprises a halogen heater.

7. The cooking apparatus according to claim 1, wherein the reflection member includes at least one uneven surface part disposed in a center of the reflection member.

8. A cooking apparatus comprising:
a plate to put a cooker thereon;
a heater disposed under the plate; and
a reflection member disposed under the heater, the reflection member including at least one uneven surface part to reflect the energy emitted from the heater in several directions; and
a guide member provided between the plate and the heater,
wherein the reflection member includes a peripheral part supporting the guide member.

9. The cooking apparatus according to claim 8, wherein the uneven surface part comprises at least one plane surface.

10. The cooking apparatus according to claim 8, wherein the peripheral part encloses a lateral side of the heater.

* * * * *